H. A. LARDNER & G. F. CHELLIS.
STEERING APPARATUS.
APPLICATION FILED OCT. 2, 1913.
1,144,552.
Patented June 29, 1915.
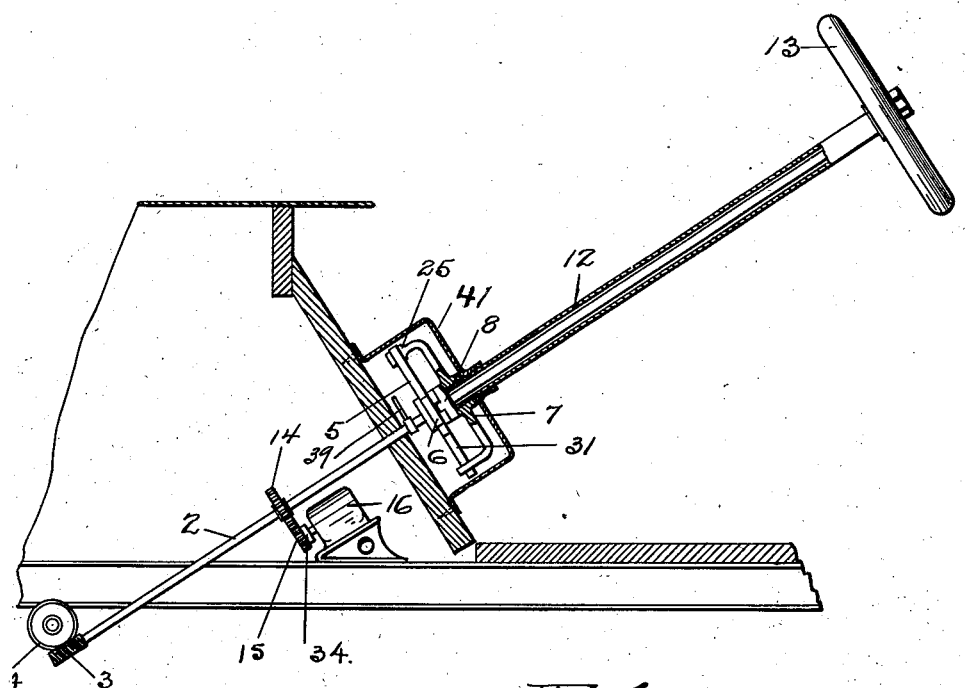
Fig. 1.
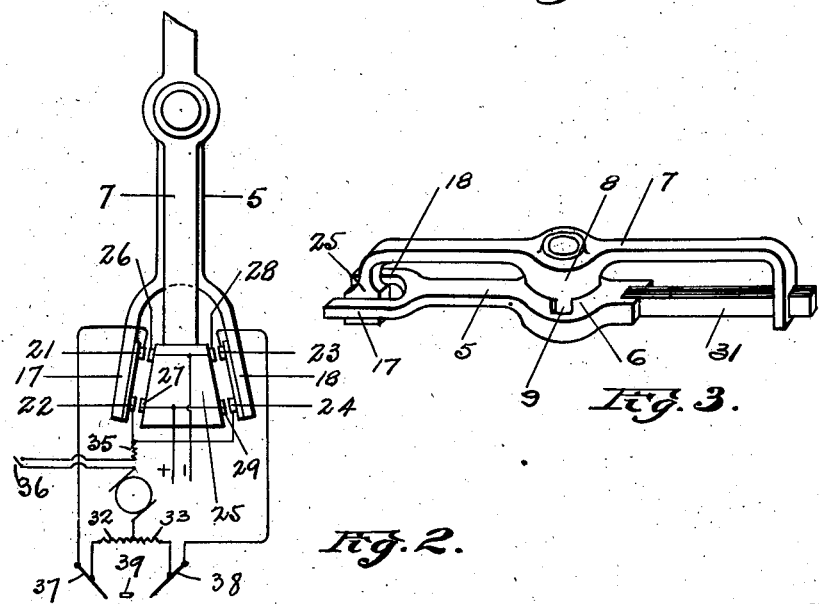
Fig. 2.
Fig. 3.
WITNESSES:
H. G. Pint.
P. S. Pidwell
INVENTORS
H. A. LARDNER
AND G. F. CHELLIS
BY Miller & White
their ATTORNEYS.

UNITED STATES PATENT OFFICE.

HENRY A. LARDNER AND GEORGE F. CHELLIS, OF SAN FRANCISCO, CALIFORNIA.

STEERING APPARATUS.

1,144,552.  Specification of Letters Patent. Patented June 29, 1915.

Application filed October 2, 1913. Serial No. 793,056.

*To all whom it may concern:*

Be it known that we, HENRY A. LARDNER and GEORGE F. CHELLIS, citizens of the United States, and residents of the city and county of San Francisco, State of California, have invented certain new and useful Improvements in Steering Apparatus, of which the following is a specification.

The invention relates to steering apparatus for power propelled vehicles.

The object of the invention is to provide a steering apparatus for motor vehicles, which greatly facilitates the steering of the vehicle without interfering with the usual manually operated steering apparatus.

Another object of the invention is to provide a steering apparatus in which a motor operates to assist the driver in steering the vehicle, thereby relieving him of much muscular effort.

Another object of the invention is to provide a steering apparatus in which the steering of the vehicle is always under the manual control of the driver, and in which means are provided for assisting the driver in steering the vehicle.

The invention possesses other advantageous features, which, with the foregoing, will be set forth at length in the following description, where we shall outline in full, that form of the invention which we have selected for illustration in the drawings accompanying and forming part of the present specification.

The novelty of the invention will be included in the claims succeeding said description. From this it will be apparent that we do not limit ourselves to the showing made by such drawings and description, as we may adapt many variations within the scope of our invention as expressed in said claims.

Referring to the drawings: Figure 1 is a side view of the steering apparatus, partly in section. Fig. 2 is a detail of the contactor arm, and a diagrammatic representation of the wiring for an electric motor drive. Fig. 3 is a perspective view of the power controlling means.

The apparatus of our invention is designed so that the hand wheel is always in positive connection with the guiding wheels of the vehicle, thereby insuring absolute safety in driving the vehicle. The power steering means operates as an assistant to relieve the driver of muscular effort and produces the effect of a steering apparatus having very little resistance to operation, but one which is absolutely at all times under the control of the driver. The assisting power means may be an electric motor when the vehicle is equipped with an electric system, may be a compressed air motor when the vehicle is provided with a compressed air system, or may be any suitable prime mover, an electric motor being shown herein, since most power propelled vehicles of the present day are provided with electric systems for auxiliary purposes.

The steering device comprises the usual steering rod or shaft 2 which engages with the steering lever of the vehicle, by means of the worm 3 and worm wheel 4 or by other suitable means, so that a rotation of the rod accomplishes the steering of the vehicle. Secured to the steering rod 2 is an arm 5 which is provided centrally with a clutch face 6, composed preferably of several radially extending slots. Engaging the arm 5 at the center is a contactor arm 7 having a central clutch face 8, preferably composed of radial teeth 9, engaging the clutch face 6. The teeth on the clutch face 8 are narrower than the slots in clutch face 6 so that the two arms are capable of limited movement with respect to each other. Secured to the contactor arm 7 is the sleeve 12, which is secured to the steering wheel or hand wheel 13. It is evident, therefore, that there is a certain degree of freedom of movement between the steering wheel 13 and the steering rod 2, but that the wheel and rod are positively connected in the direction of rotation, so that the vehicle may be guided by the steering wheel. The amount of freedom of movement is slight and is hardly perceptible in driving the vehicle, since a certain freedom of movement always exists between the steering rod and the guiding wheels.

Attached to the steering rod is a gear 14 which meshes with a gear 15 on the electric motor 16, and the relative freedom of movement of the two arms 5 and 7 is employed to operate the motor controlling apparatus which in this instance operates to close electric circuits which rotate the motor in the proper direction. In the present embodiment, the arm 5 is provided with a bifurcated end comprising the two forks 17—18 on which are arranged respectively the properly insulated contacts 21—22 and 23—24. Disposed between the forks 17—18 is the head 25 of the arm 7 which is provided on opposite sides with properly insulated contacts 26—27 and 28—29 adapted to engage the contacts 21—22 and 23—24 respectively. The distance between the contacts 21—22 and 23—24 is greater than the distance between contacts 26—27 and 28—29, so that when the head is centrally disposed between the forks, the contacts are all out of engagement. The head is normally held in this neutral position by suitable means, such as the flat spring 31 fastened to the arm 5 and engaging in a slot in the opposite end of arm 7. The freedom of movement of the arm 7 between the forks 17—18 is less than the freedom of movement afforded by the clutch, so that as the steering wheel is turned the proper pairs of contacts are brought into engagement. As soon as the contacts engage each other, the tooth 9 of the clutch engages the coöperating face of the clutch part 6, thereby preventing a great pressure from being applied to the contacts.

The contacts 26 and 28 are connected to one side of the power circuit and contacts 27 and 29 are connected to the other side of the power circuit. Contacts 22 and 24 are connected to one side of the motor armature, contact 21 is connected to the other side of the armature through the field winding 32 and contact 23 is connected to the other side of the armature of the motor through the oppositely wound field winding 33. Arranged between the motor shaft and the gear 15 is a magnetic clutch 34, which is operated by the winding 35 arranged in series in the motor circuit. With this arrangement, the clutch connects the two parts only when current is flowing in the motor circuit, so that if for some reason the circuit is broken or the supply of current fails, the motor automatically is disconnected from the steering rod, obviating the necessity of turning the motor over in hand steering.

Means are also provided for opening the motor circuit and disconnecting the motor from the steering rod when it is desirable to steer the vehicle entirely by hand. This is accomplished by means of a switch 36, arranged in the motor circuit and located conveniently to the driver of the vehicle. This arrangement is advisable on account of the liability of failure of the motor or electric system. The arms and contacts are preferably arranged above the foot board of the vehicle so that they may be readily accessible and are preferably covered with a housing 41. Limit devices are also preferably employed to open the motor circuit as the guiding wheels reach or approach their limit of turning in either direction. Should the steering wheel be turned by hand to move the guiding wheels to the limit of their movement, the motor will not be able to turn them further, and would not open the motor circuit at the contact points, since the steering rod must be moved slightly further than the steering wheel in order to break the contacts. Such condition would stall the motor with the current on and would either burn out the motor or drain the storage battery, if permitted to continue for a material period. In order to obviate this difficulty we employ limit switches 37—38 arranged preferably in the motor field circuits either of which is opened by the movement of the steering wheel to the limit of its throw, that switch being opened which is in the closed field circuit at that time. The switches may be arranged on the dash of the vehicle and may be operated by a finger 39 secured to the steering shaft 2.

The initial turning of the steering wheel in either direction moves the contact arm to cause the proper contacts to engage, thereby energizing the motor which rotates the steering rod in the same direction, tending to separate the contacts. The continued rotating of the steering wheel holds the contacts in engagement until the proper amount of turning of the guiding means is obtained, and when the rotation of the steering wheel ceases, the contacts are separated and the guiding means remain in that position until they are again moved by the turning of the steering wheel. Since the steering wheel is positively connected with the guiding means or wheels, the position of these wheels is always under the positive control of the driver, and should the steering wheel be rotated at a greater angular velocity than the motor is capable of turning the steering rod, the guiding wheels will be moved by the steering wheel, thereby allowing abrupt changes in the direction of travel of the vehicle when necessary. It is evident that the greater the force exerted on the steering wheel, the less work is required of the motor, hence it revolves at a greater speed. A turning of the steering wheel through a given angle in one direction causes a corresponding amount of turning of the guiding means in that direction, the amount of turning of the guiding means being proportionate to the amount of turning of the steering wheel.

We claim:

1. In a power propelled vehicle, guiding means, a steering rod connected to said guiding means, an electric motor adapted to rotate said steering rod, a steering wheel, an arm on said steering rod, an arm connected to said steering wheel having a limited angular movement with respect to said first mentioned arm, contacts on said arms adapted to be brought into contact with each other by said relative movement and conductors connecting said contacts with the source of power and the electric motor.

2. In a power propelled vehicle, guiding means, a steering rod connected to said guiding means, an electric motor adapted to rotate said steering rod, a steering wheel, an arm connected to said steering rod, an arm connected to said steering wheel, one of said arms having a bifurcated end between the forks of which the end of the other arm is disposed, the distance between the forks being greater than the width of that portion of the other arm disposed therebetween, so that the steering wheel has a limited angular movement relative to the steering rod, contacts on said forks and other arm and electric circuits connecting said contacts with the source of power and the electric motor.

3. In a power propelled vehicle, guiding means, a steering rod connected thereto, an electric motor adapted to rotate said steering rod, an arm connected to said steering rod, an arm connected to said steering wheel, one of said arms having a bifurcated end between the forks of which a portion of the other arm of less width than the distance between the forks is disposed, means for normally holding said portion spaced from said forks, contacts on said portion and forks, and electric circuits connecting said contacts with the source of power and the motor.

4. In a power propelled vehicle, guiding means, a steering rod connected thereto, a motor geared to said steering rod, a steering wheel, means connecting said steering wheel and rod arranged to permit a limited angular movement of one with respect to the other, controlling means for said motor adapted to be operated by said relative angular movement, and a magnetic clutch arranged between said motor and steering rod.

5. In a power propelled vehicle, guiding means, a steering rod connected thereto, an electric motor adapted to rotate said steering rod, a steering wheel, a sleeve secured thereto, an arm on said steering rod, an arm on said sleeve, said arms being formed at their center with engaging clutch faces arranged to permit a limited relative angular movement of said sleeve and rod, a bifurcated end on one arm, a head on the other arm engaging between the forks of said bifurcation, means for normally holding said head spaced from said forks, contacts on said head, and forks adapted to be brought into engagement by a movement of the steering wheel relative to the steering rod, and circuits connecting said contacts with the source of power, and the electric motor, said circuits being arranged so that a movement of the steering wheel in one direction causes a rotation of the motor in one direction, and a movement of the steering wheel in the opposite direction causes a rotation of the motor in the opposite direction.

6. In a power propelled vehicle, guiding means, a steering wheel, means continually connecting said wheel and guiding means, a motor connected to said means, means for controlling said motor, and a magnetic clutch, the coil of which is in series with the motor, arranged between said motor and connecting means.

7. In a power propelled vehicle, guiding means movable between certain predetermined limits, a steering wheel, means continually connecting said wheel and means, a motor connected to said means, means for controlling said motor, and a switch in the motor field circuit adapted to be opened when the guiding means reaches the limit of its movement and means on said means connecting the wheel and guiding means for opening said switch.

8. In a power propelled vehicle, guiding means movable between certain limits, a steering wheel, means continuously connecting said wheel and means, a motor connected to said means provided with reversely arranged field windings, means for closing the circuit through either of said windings and switches in the field circuits, said switches being arranged so that one of them is opened by the movement of the guiding means to the limit of its movement.

In testimony whereof, we have hereunto set our hands at San Francisco, California, this 24th day of September, 1913.

HENRY A. LARDNER.
GEORGE F. CHELLIS.

In presence of—
F. W. GAY,
S. E. MEAD.